United States Patent
Gnoss et al.

(10) Patent No.: US 10,048,160 B2
(45) Date of Patent: Aug. 14, 2018

(54) VALVE OPERATION AND DIAGNOSIS

(71) Applicant: Siemens Aktiengesellschaft, Munich (DE)

(72) Inventors: Thomas Gnoss, Muggensturm (DE); Michael Heger, Muggensturm (DE); Rainer Lochschmied, Rheinstetten-Forchheim (DE); Anton Pallek, Muggensturm (DE); Mike Schmanau, Malsch (DE); Bernd Schmiederer, Karlsruhe (DE); Martin Wetzel, Rastatt (DE); Armin Wiegand, Lichtenau (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 259 days.

(21) Appl. No.: 14/808,339

(22) Filed: Jul. 24, 2015

(65) Prior Publication Data
US 2016/0069772 A1    Mar. 10, 2016

(30) Foreign Application Priority Data
Sep. 10, 2014    (EP) .................................... 14184273

(51) Int. Cl.
*G01M 3/28*    (2006.01)
*G05D 7/06*    (2006.01)
(Continued)

(52) U.S. Cl.
CPC ............. *G01M 3/2876* (2013.01); *F23N 5/18* (2013.01); *F23N 5/242* (2013.01); *G05B 15/02* (2013.01);
(Continued)

(58) Field of Classification Search
CPC ........ G01M 3/2876; F23N 5/18; F23N 5/242; F23N 2027/18; F23N 2027/20;
(Continued)

(56) References Cited

U.S. PATENT DOCUMENTS 4,669,440 A * 6/1987 Takase .................... F02D 41/20
 123/478
4,825,198 A * 4/1989 Rolker ................ F16K 37/0091
 340/605
(Continued)

FOREIGN PATENT DOCUMENTS

| CN | 201173845 Y | 12/2008 | ............... G01F 1/00 |
| CN | 101858764 A | 10/2010 | ............... G01F 1/84 |

(Continued)

OTHER PUBLICATIONS

European Search Report, Application No. 14184273.2, 7 pages, dated Feb. 23, 2015.
(Continued)

*Primary Examiner* — Thomas C Lee
*Assistant Examiner* — Tri T Nguyen
(74) *Attorney, Agent, or Firm* — Slayden Grubert Beard PLLC

(57) ABSTRACT

A method is disclosed for diagnosing a valve assembly having valve members serially arranged along a flow channel of the valve assembly connecting at least one inlet and at least one outlet of the valve assembly. All of the serially arranged valve members of the valve assembly are opended to allow fluid to flow through the flow channel. The flow of fluid through the flow channel is measured by at least one sensor. At least one of the valve members is openend, and at least one sensor checks for fluid leakage caused by at least one faulted valve member. The at least one sensor may include a flow sensor, e.g., a mass flow sensor.

18 Claims, 10 Drawing Sheets

(51) Int. Cl.
 *G05B 15/02* (2006.01)
 *F23N 5/18* (2006.01)
 *F23N 5/24* (2006.01)
(52) U.S. Cl.
 CPC ........ *G05D 7/0635* (2013.01); *F23N 2027/18* (2013.01); *F23N 2027/20* (2013.01); *F23N 2031/10* (2013.01); *F23N 2031/18* (2013.01)
(58) Field of Classification Search
 CPC . F23N 2031/10; F23N 2031/18; G05B 15/02; G05D 7/0635
 See application file for complete search history.

(56) References Cited

U.S. PATENT DOCUMENTS

| | | | | |
|---|---|---|---|---|
| 5,703,313 | A * | 12/1997 | Pierce | G10H 1/125 84/622 |
| 6,023,969 | A * | 2/2000 | Feller | G01F 1/6842 374/132 |
| 6,614,230 | B2 * | 9/2003 | Raichle | F02D 35/021 324/399 |
| 2003/0114709 | A1 * | 6/2003 | Rudinger | C07C 51/245 562/527 |
| 2011/0053099 | A1 | 3/2011 | Böing | 431/2 |
| 2014/0130723 | A1 | 5/2014 | Conrads et al. | 110/347 |
| 2015/0168956 | A1 * | 6/2015 | Guan | G01N 30/32 137/2 |

FOREIGN PATENT DOCUMENTS

| | | | | |
|---|---|---|---|---|
| CN | 102928181 A | | 2/2013 | G01M 3/24 |
| DE | 10247167 | * | 4/2004 | |
| DE | 102011000113 | * | 7/2012 | |
| DE | 102012014260 A1 | | 1/2013 | F23D 1/00 |
| DE | 102011000113 B4 | | 8/2013 | G01M 3/26 |
| EP | 0466067 A1 | | 1/1992 | F23N 5/24 |
| EP | 1236957 B1 | | 11/2006 | F23L 17/00 |
| EP | 2292976 A2 | | 3/2011 | F23D 14/12 |
| RU | 2396484 C1 | | 8/2010 | F16K 37/00 |
| WO | 2005/073687 A1 | | 8/2005 | G01M 3/28 |

OTHER PUBLICATIONS

Chinese Office Action, Application No. 201510573595.4, 13 pages, dated Mar. 2, 2018.

\* cited by examiner

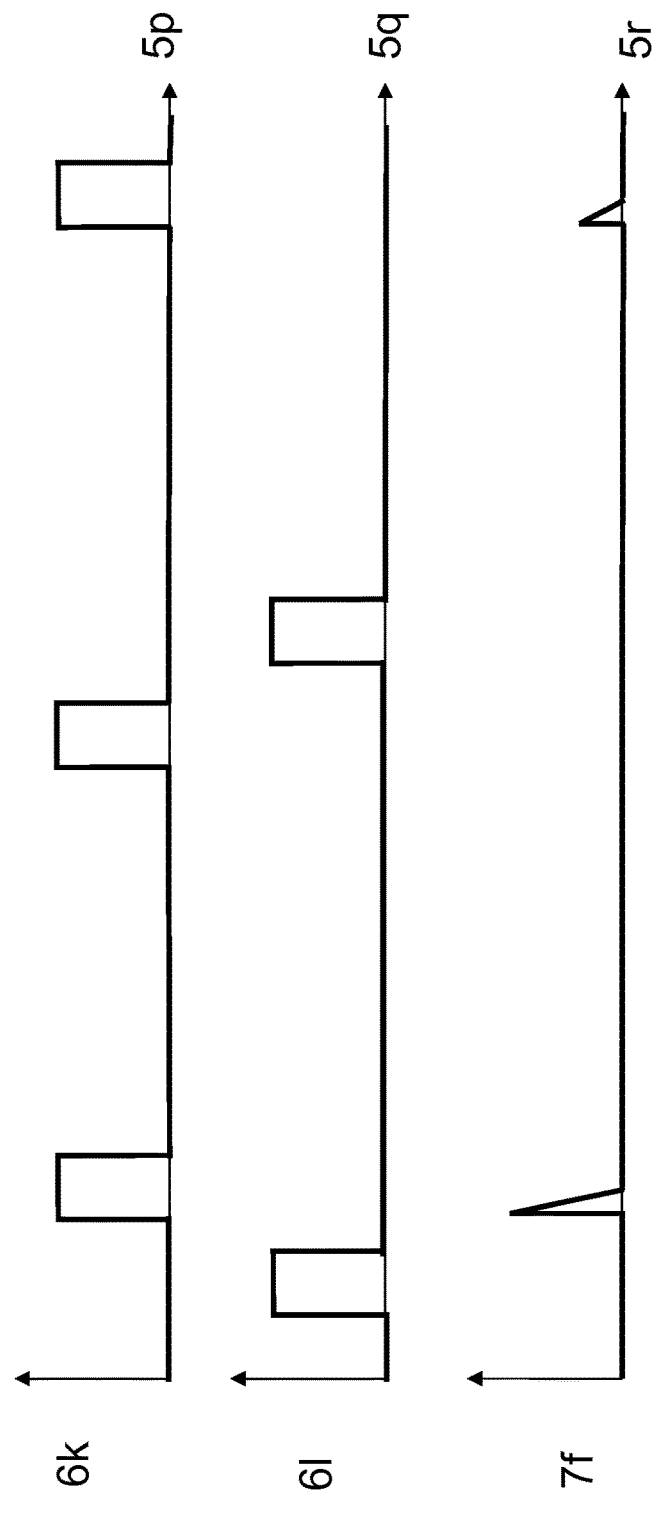

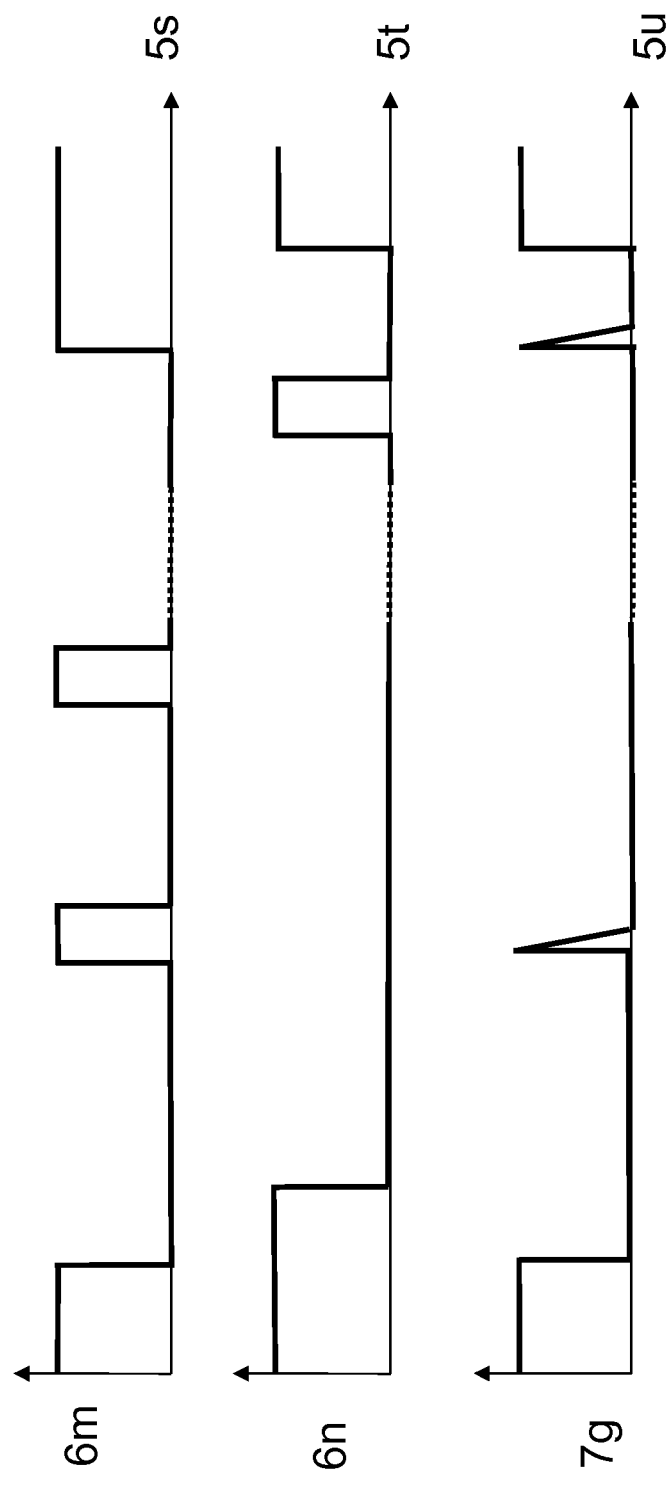

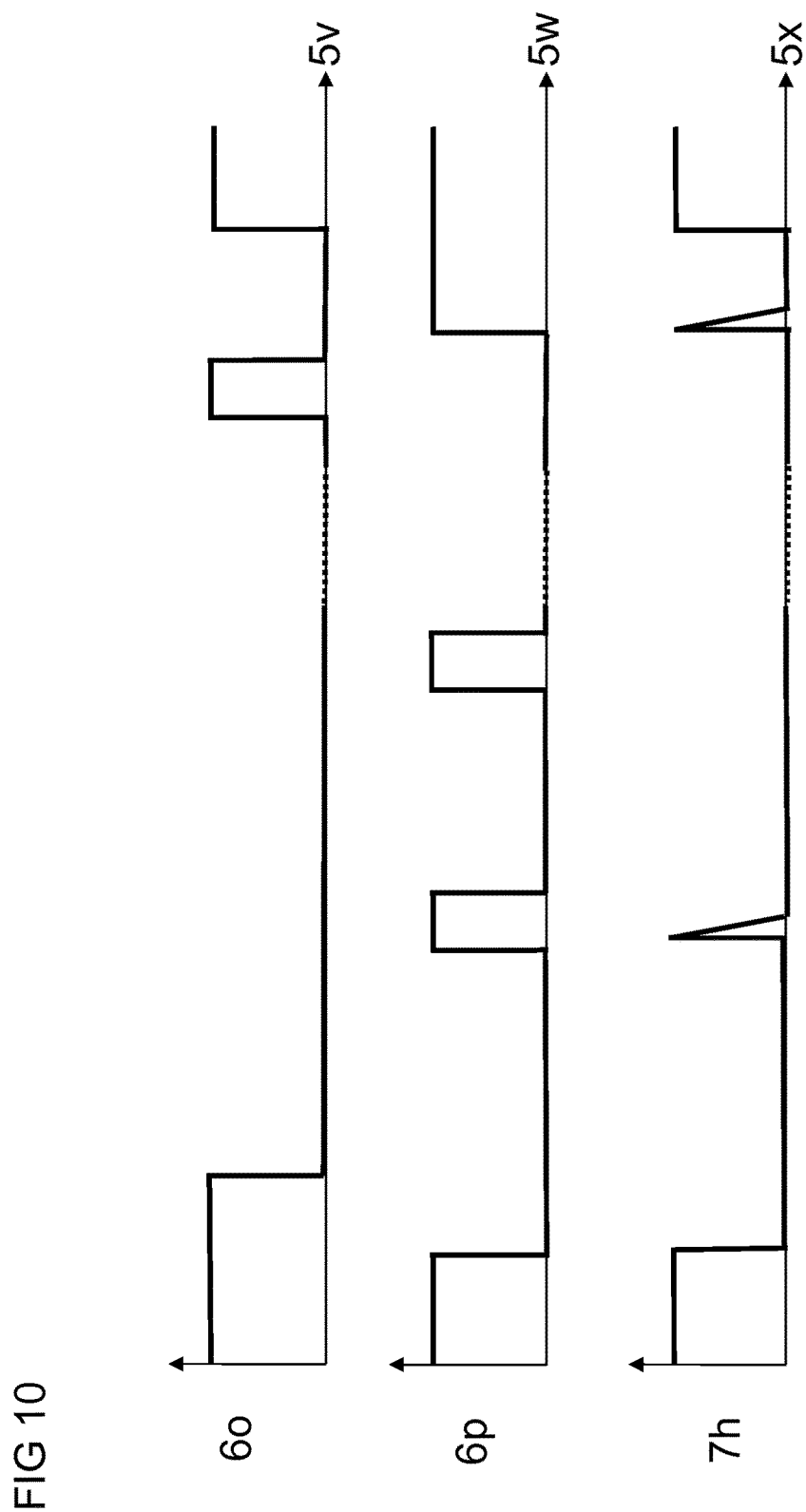

VALVE OPERATION AND DIAGNOSIS

CROSS-REFERENCE TO RELATED APPLICATIONS

This application claims priority to EP Application No. 14184273.2 filed Sep. 10, 2014, the contents of which are hereby incorporated by reference in their entirety.

TECHNICAL FIELD

The present disclosure relates to an apparatus and to a method for testing a valve assembly. More particularly, the present disclosure relates to an apparatus and to a method for detecting leakage and input pressure status in a valve assembly.

BACKGROUND

Valves and valve assemblies are frequently employed in conjunction with the regulation of the flow of a fluid. Typical appliances are gas-fired installations, where the flow of a gas to a combustion chamber or to a burner is regulated. Examples of gas-fired installations include, but are not limited to, water heaters, boilers, stoves, dryers, deep fryers, fireplaces.

Valve assemblies typically provide one or several valve members. The valve members are arranged in a flow channel that connects the inlet of the valve assembly to its outlet. To open or close a gas valve, one or several actuators drive a valve member into or out of a flow channel.

Certain applications require modulating gas valves. Modulating gas valves allow precise control of the mass flow of a gas by adjustment of a valve member. As the position of the valve member of a modulated valve may be anywhere between fully open and fully closed, the flow of a gas may vary accordingly.

A gas valve assembly may actually provide several valve members that are sequentially arranged. With each valve member adapted to fully close the flow channel, a solution with two valve members achieves technical redundancy. That is, both of the valve members need to malfunction in order for the entire assembly to undergo failure.

Valve diagnosis may yield even more reliable solutions, especially in cases where a (catastrophic) failure of a gas valve is not acceptable. To that end, a gas valve may provide a plurality of sensors and a control unit to detect leakage and/or imminent failure.

The German patent DE102011000113B4 was granted on 14 Aug. 2013 and discloses a valve assembly 10 with two valve members 15, 16. The valve assembly according to DE102011000113B4 also provides a pressure sensor 18. The pressure sensor 18 is configured to measure gas pressure in a middle section 17 in between the valve members 15, 16. Diagnostic information about the valve can be derived from the measurement of pressure in the intermediate volume 17.

The pressure sensor 18 of the valve assembly of DE102011000113B4 connects to a controller 11. During a diagnostic check, the controller 11 opens or closes a first valve member 15 and then opens or closes a second valve member 16. In a subsequent check, the controller 11 reverses the sequence of opening or closing the valve members 15, 16. The controller will thus first open or close the second valve member 16 and then do the same with the first valve member 15. The reversal of the sequence aims at extending the useful life of the assembly 10.

The patent EP1236957B1 was granted on 2 Nov. 2006 and discloses a burner-operated device. The device comprises a valve 19 and a pressure sensor 28. Both the valve 19 and the pressure sensor 28 are connected to a control unit 30. The control unit 30 matches a flow of combustible gas to a flow of air for optimum performance of the burner-operated device.

The patent EP1236957B1 teaches the pressure sensor 28 may in an alternate embodiment also be a mass flow sensor. In contrast to a pressure sensor 28, a mass flow sensor will allow for a direct determination of gas flow.

The aforementioned publications EP1236957B1 and DE102011000113B4 do not focus on harnessing a flow sensor to perform valve diagnosis. Instead, they deal either with long service life or with optimum gas to air ratio. In particular, EP1236957B1 and DE102011000113B4 do not teach how to come up with diagnostic equipment that responds to rapid changes in flow rate. Also, the disclosures of EP1236957B1 and of DE102011000113B4 do not focus on equipment that is capable of measuring gas flow in service and of performing valve diagnosis. That is, the combination of accurate flow measurements and of reliable diagnosis has not been dealt with in detail.

Start-up operations of the burner that are unnecessary to the unavailability of combustible gas are to be avoided. The gas input pressure is typically checked by a gas pressure sensor or by a gas pressure switch before a fire control unit runs the start-up sequence. In particular, a check of gas input pressure is performed before opening both gas valves.

In addition, the input gas pressure is checked by a pressure sensor to avoid excessive input pressure. A condition with excessive input pressure may, for instance, occur due to a failed pressure governor.

SUMMARY

One embodiment provides a method of diagnosis of a valve assembly with valve members serially arranged along a flow channel of the valve assembly, the method comprising: at least one flow sensor measuring the flow of a fluid through the flow channel of a gas-fired installation in operation; closing at least one of the serially arranged valve members of the valve assembly, such that no fluid can flow through the flow channel connecting at least one inlet and at least one outlet of the valve assembly; opening at least one of the valve members of the valve assembly, such that fluid may flow from the upstream side of the at least one valve member to its downstream side; at least one flow sensor measuring at least one signal related to fluid flow; determining at least one quantity characterizing the at least one signal; comparing the at least one quantity to at least one threshold value; and checking whether or not the at least one quantity exceeds the at least one threshold value; wherein the at least one sensor is configured to measure flow velocities between 0.1 m/s and 5 m/s, such that the flow sensor is configured to measure leakage caused by an at least one faulted valve member and is configured to measure typical flow velocities through the flow channel of a gas-fired installation in operation.

In a further embodiment, the method comprises the step of closing all of the serially arranged valve members of the valve assembly, such that the flow of fluid through the flow channel connecting at least one inlet and at least one outlet of the valve assembly is interrupted.

In a further embodiment, the method comprises the step of the at least one sensor checking for the absence of flow of a fluid through the valve assembly.

In a further embodiment, the fluid detected by the flow sensor is gaseous and/or combustible.

In a further embodiment, the flow sensor is a mass flow sensor.

In a further embodiment, at least one quantity characterizing the at least one signal is determined by integrating the at least one signal.

In a further embodiment, integration of a pulse is carried out between a start point and an end point; wherein the start point is selected from the instant of valve opening or from the instant of the pulse reaching a threshold, preferably 50% of the peak of the pulse, along the rising edge of the pulse; and wherein the end point is the moment of the pulse reaching a threshold, preferably 10%, 50%, or 90% of the peak of the pulse, along the falling edge of the pulse.

In a further embodiment, the at least one quantity characterizing the at least one signal is the peak of the at least one signal.

In a further embodiment, at least one quantity characterizing the at least one signal is the pulse width between the rising and the falling edge of the pulse measured at 50% or at 10% or at 90% of the peak of the pulse.

In a further embodiment, the at least one quantity characterizing the at least one signal is determined by multiplying the integral and the peak of the at least one signal.

In a further embodiment, the method further comprises the step of a control unit checking the at least one quantity against a threshold to generate an indication of valve status.

In a further embodiment, the method further comprises the step of a control gate either enabling fluid flow, preferably enabling fluid flow for normal steady state operation, or permanently stopping fluid flow, or temporarily stopping fluid flow depending on valve status.

In a further embodiment, the method further comprising the step displaying an indication of valve status for the purposes of maintenance, servicing and/or repair.

Another embodiment provides a non-transitory, tangible computer readable medium having instructions executable by a processor to perform any of the methods disclosed above.

Another embodiment provides a valve assembly, comprising: at least one inlet and at least one outlet; a flow channel connecting the at least one inlet to the at least one outlet; a plurality of valve members serially arranged along a flow channel of the valve assembly; at least one actuator for opening at least one of the valve members of the valve assembly; and at least one flow sensor configured to measure flow velocities between 0.1 m/s and 5 m/s, such that the flow sensor is configured to measure leakage caused by at least one faulted valve member and is configured to measure typical flow velocities through the flow channel of a gas-fired installation in operation.

In a further embodiment, the flow sensor is arranged in between the inlet of the valve assembly and the at least one valve member closest to the inlet.

In a further embodiment, the flow sensor is arranged in between the outlet of the valve assembly and the last valve member closest to the outlet or wherein the valve assembly comprises two valve members and the flow sensor is arranged in between the two valve members.

In a further embodiment, at least one of the valve members is a modulating valve member or wherein at least one of the valve members is an on/off valve.

In a further embodiment, the valve assembly additionally comprises: at least one actuator configured to actuate a valve member; at least one control unit configured to excite the at least one actuator through at least one excitation signal; wherein the control unit is configured to excite the at least one actuator in accordance with least one predefined program sequence and in response to at least one request signal; wherein the control unit is configured to generate at least one indication of valve status as a result of excitation in accordance with the at least one program sequence; and wherein the valve assembly further comprises at least one control gate configured to transmit or to suppress the at least one request signal.

BRIEF DESCRIPTION OF THE DRAWINGS

Example embodiments are discussed below with reference to the figures, in which:

FIG. 8 shows the same measurement sequence as FIG. 6, but with the upstream valve member being faulty (leaking).

FIG. 9 shows a leakage test that follows a normal shut down procedure.

FIG. 10 shows another leakage test that follows a normal shut down procedure.

DETAILED DESCRIPTION

Figure 1:
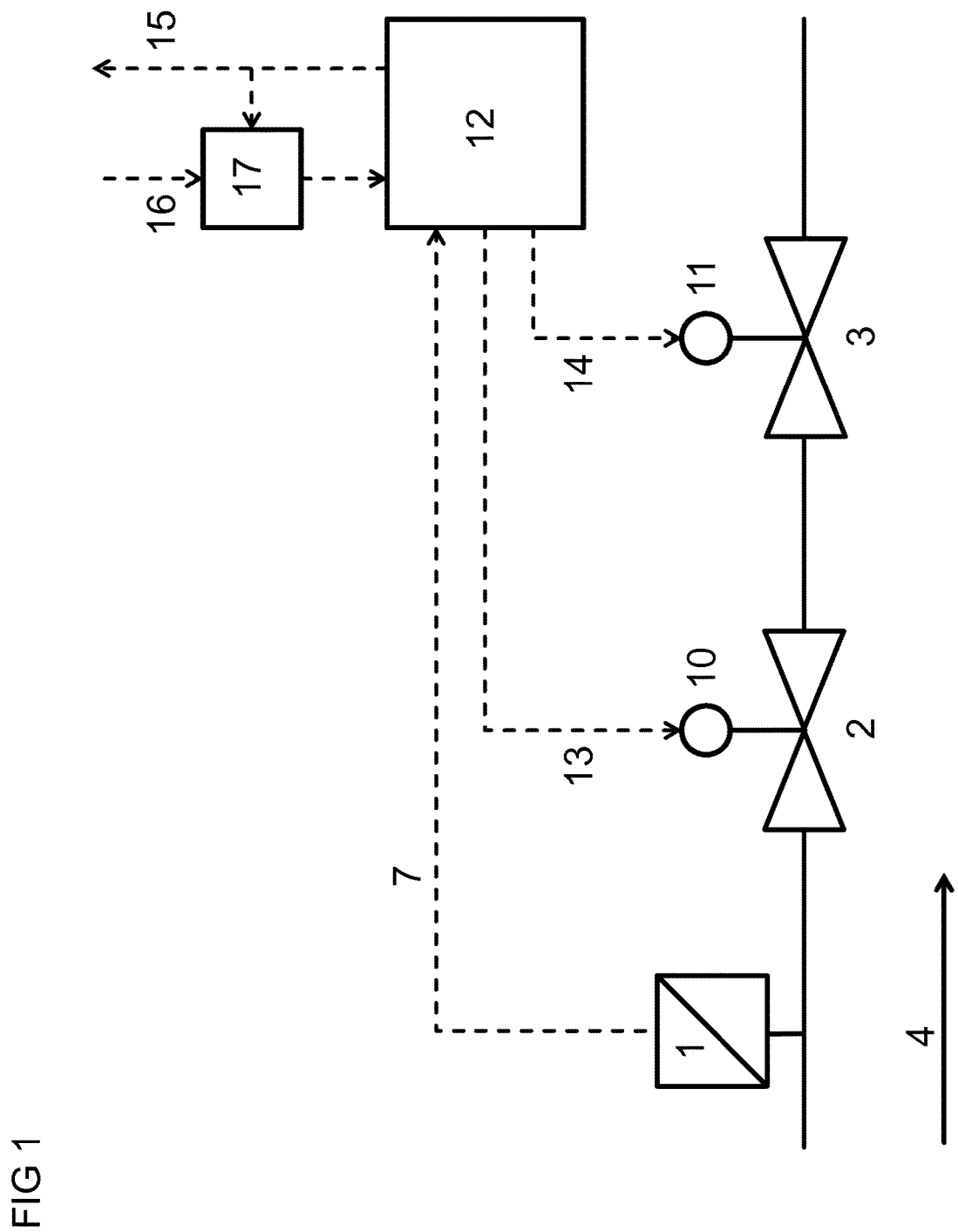
FIG. 1 shows a valve assembly according to an embodiment.

Embodiments of the present invention provide methods and apparatus for diagnosing a valve, e.g., a gas valve, using one or more sensors, e.g., a mass flow sensor.

Some embodiments are based on the advent of new mass flow sensors, e.g., new thermal mass flow sensors. These sensors allow for measurements over a particularly wide range and very short response times of less than 100 ms. The wide measurement range of these mass flow sensors facilitates measurements of small flow rates caused for example by leakages. A valve assembly with a volume of 0.2 l may, by way of example, be configured to detect leakages of 50 l/h. Leakages of 50 l/h typically correspond to flow velocities between 0.01 m/s and 0.1 m/s. At the same time, the new sensors allow for measurements of large flow rates such as flow rates in conjunction with a gas-fired installation in operation. Typical values of such flow rates are subsets of a range of flow rates between 0.5 m/s and 5 m/s, 10 m/s, 15 m/s, 20 m/s, or even 100 m/s. Mass flow sensors suitable for the purposes declared herein can be type OMRON® D6F-W or type SENSOR TECHNICS® WBA sensors. This list is not exhaustive. The useful range of these sensors typically starts at any of the velocities between 0.01 m/s and 0.1 m/s and ends at any of the velocities of 5 m/s, 10 m/s, 15 m/s, 20 m/s, or even 100 m/s. That is, lower limits of 0.1 m/s can be combined with any of the upper limits of 5 m/s, 10 m/s, 15 m/s, 20 m/s, or even 100 m/s.

Preferably, mass flow sensors suitable for the purposes declared herein comprise a single sensor element. By contrast, mass flow sensors with multiple sensor elements comprise two or more sensor elements. Each of these sensor elements acts to measure flow velocities within a limited range. An (electronic) switch may then be employed to combine multiple sensor elements into one sensor. To that end, the switch selects a particular sensor element in accordance with the flow velocities to be measured.

In a further embodiment, a mass flow sensor is installed upstream of the valve assembly.

In a further embodiment, a mass flow sensor is installed downstream of the valve assembly.

In a further embodiment, a mass flow sensor is installed in a flow channel between two valve members of a valve assembly.

In a further embodiment, a signal from a mass flow sensor is integrated to provide an accurate indication of leakage.

In a further embodiment, the peak of a signal from a mass flow sensor accurately indicates leakage.

Further embodiments provide an apparatus and a method for valve diagnosis that harness design parameters of an installation to enhance the quality of diagnostic indications.

Further embodiments provide an apparatus and a method for valve diagnosis that use a time series of measurements for the detection and/or identification of leakages.

In a further embodiment, a sensor signal is obtained after or before opening or closing of a valve member and is processed to derive indications of gas leakage.

In a further embodiment, a sensor signal is obtained during opening or closing of a valve member and is processed to derive indications of gas leakage.

Further embodiments provide a gas-fired installation with a unit for valve diagnosis and for flow measurement.

Further embodiments provide an apparatus and a method to generate a maintenance signal if valve diagnosis indicates a leakage above a predefined warning threshold.

Further embodiments provide an apparatus and a method to permanently interrupt gas flow through all valve members if valve diagnosis indicates a leakage above a predefined lock-out threshold.

Further embodiments provide an apparatus and a method for input pressure diagnosis wherein a sensor signal is obtained during opening or closing of a valve member and is processed to derive indications of gas input pressure.

Further embodiments provide an apparatus and a method to temporarily interrupt gas flow through all valve members if input pressure is below a predefined minimum pressure threshold.

Further embodiments provide an apparatus and a method to stop the gas flow through all valve members temporary while the input pressure is over a predefined maximum pressure threshold.

Further embodiments provide an apparatus and a method to generate a maintenance signal if input pressure drops below a predefined minimum pressure threshold or rises above a predefined maximum pressure threshold.

FIG. 1 shows a valve assembly with two valve members 2, 3, according to an example embodiment. Arrow 4 indicates the direction of fluid flow through the valve.

The valve members 2, 3 are arranged in series. In other words, valve 3 is arranged downstream of valve 2. Accordingly, the valve assembly provides an inlet that is arranged upstream of valve member 2. The outlet of the valve assembly is arranged downstream of valve member 3. A flow channel connects the inlet 2 to the outlet 3. The valve members 2, 3 are arranged to alter the flow of fluid through the flow channel.

The two valve members 2, 3 are each capable of interrupting the flow of a fluid through the valve assembly provided none of them 2, 3 is faulted. It is envisaged that at least one of the valves 2, 3 may be a modulating valve so as to vary the flow rate of a fluid during burner operation. A modulating valve is, however, not required in order to provide the functionality of valve diagnosis. A third, independent, valve may also act to vary the flow rate of a fluid.

In a preferred embodiment the fluid flowing through the valve assembly is gaseous at room temperature. In a particular embodiment, the fluid is a combustible gas. In yet another particular embodiment, the fluid is air.

A mass flow sensor 1 is arranged upstream of the first valve member 2. The mass flow sensor 1 typically is a thermal sensor with a wide measurement range. That is, the mass flow sensor 1 acts to detect and to measure a small flow of fluid due to a leakage. The mass flow sensor 1 can preferably also detect and measure large fluxes in conjunction with a gas-fired installation in operation.

In another embodiment, the mass flow sensor 1 is arranged in between the two valve members 2, 3. In yet another embodiment, the mass flow sensor 1 is arranged downstream of the two valve members 2, 3.

Each valve member 2, 3 is driven by an actuator 10, 11 with electrical excitation. A control unit 12 drives the excitation signals 13, 14 for each actuator 10, 11. The control unit 12 processes the sensor signal 7 of the mass flow sensor 1. The control unit 12 may be a separate unit or unit 12 can be integrated in an existing device such as a unit for combustion control.

The control unit 12 stores a programmed sequence to apply excitation signals 13, 14 to the valve actuators 10, 11. The control unit 12 will send excitation signals 13, 14 and open both valve members 2, 3 if fluid is to flow through the flow channel. This implies a gas-fired installation in operation. The skilled person understands that in a preferred embodiment the flow rate through the gas assembly can be controlled by closed loop operation.

The control unit 12 functions to provide an indication of valve status 15. An indication of valve status 15 can actually be a signal directed to external components. An indication of valve status 15 may as well be directed to other software components within an integrated system. The indication of valve status 15 acts to show the valve status to the aforementioned parts or components. The indication of valve status 15 also acts to transmit or to suppress a request for operation directed to the valves whereby both valves are open and are in steady state.

The indication of valve status 15 can be transferred via a bus signal and/or via digitally encoded signals on wires. In another embodiment, the indication of valve status 15 is transferred through software installed on an integrated system and/or through one or through several encoded analog signals. The indication of valve status 15 may also be transferred along any other suitable means of data transmission as understood by the skilled person.

The indication of valve status 15 contains information about leakage and about input pressure. The control unit 12 generates these diagnostic data as described hereinafter.

A request signal 16 transmits a request for operation from external parts or from software components to the control unit 12. In case of a normal firing request, both valves will be open. In case of no firing request, both valves will be in closed positions. The control unit 12 may then perform one or several test sequences to generate information about the valve status 15. If one or several valve members 2, 3 are modulating valves with modulating actuators 10, 11, the control unit 12 receive a request signal 16. The control unit 12 will then transmit a modulation rate to the actuators 10, 11 thereby setting the flow rate through the flow channel.

Control gate 17 will transmit or suppress the input request signal 16 in dependence on the indication of valve status 15. The control gate 17 will suppress a request for operation 16 if valve status 15 indicates leakage or an input pressure outside acceptable limits. The control gate 17 can be implemented as a special hardware and/or as software components of an integrated microcontroller system.

Figure 2:
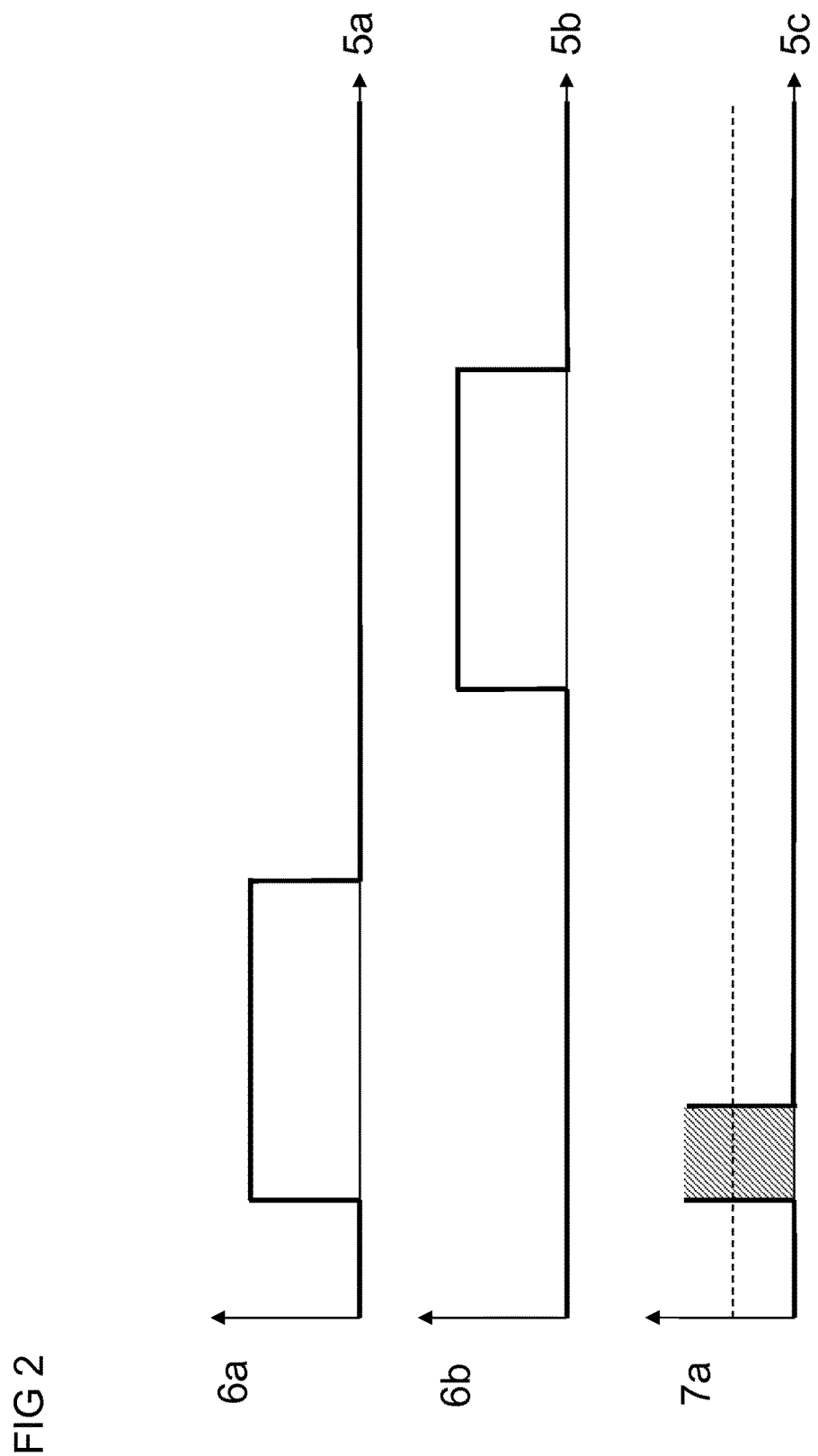
FIG. 2 provides several graphs of a valve assembly not leaking.

FIG. 2 depicts mass flow 7a versus time 5c in the absence of leakage. Let the two valve members 2, 3 each be closed and let the pressure in the flow channel in between the two valves members 2, 3 be lower than the pressure upstream of valve member 2. Further, let the mass flow sensor 1 be arranged upstream of valve member 2 as shown on FIG. 1.

The uppermost graph of FIG. 2 shows the position 6a of valve member 2. Valve member 2 opens the flow channel and after a while 5a valve member 2 closes again. Since the pressure in between the two valve members 2, 3 is somewhat lower than the pressure upstream of valve member 2, valve member 2 will experience a flow of a fluid. Consequently, the mass flow sensor 1 will pick up a signal. The same is indicated on the lowermost graph of FIG. 2.

There will be no flow and no indication of a flow signal 7a, if the pressure between the valve members 2, 3 equals the pressure upstream of the valve members.

Then valve member 3 opens and after some time 5b closes again. The graph in the centre of FIG. 2 shows valve member 3 as it opens and closes (6b). The upstream valve member 2 remains closed in the meantime. The mass flow sensor 1 will not register a flow of a fluid unless valve member 2 is leaking.

Figure 3:
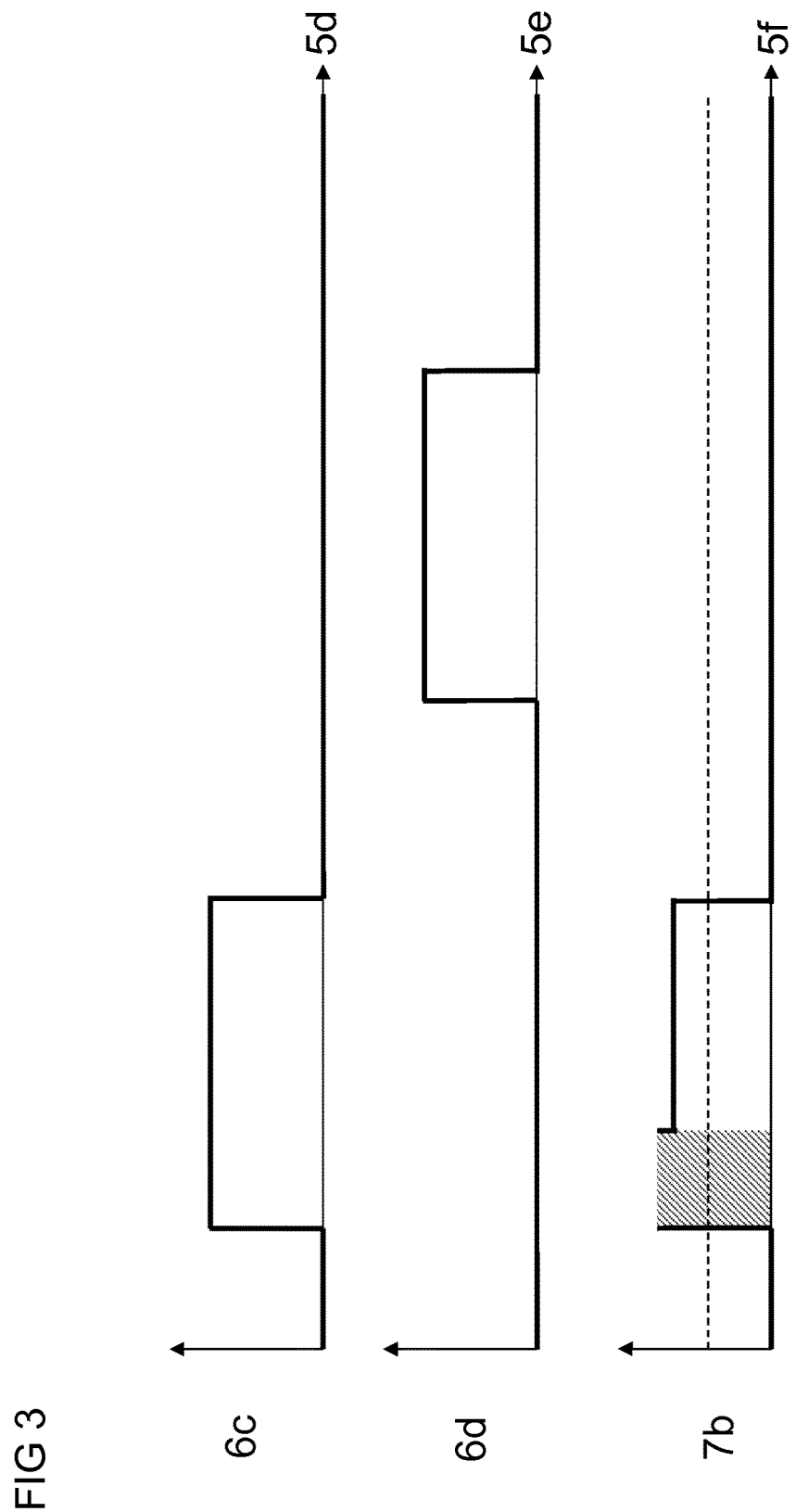
FIG. 3 provides several graphs of a valve assembly with the downstream valve member leaking.

The lowermost graph of FIG. 3 shows the signal 7b picked up by a mass flow sensor 1 with valve member 3 leaking. The uppermost graph gives the position 6c of valve member 2 and the centre graph gives the position 6d of valve member 3.

As the upstream valve member 2 opens, the mass flow sensor 1 will register fluid flow 7b into the middle section in between the valve members 2 and 3. The pressure between both valves is then below the upstream pressure, since the pressure between valves 2 and 3 drops due to leaking valve 3. The fluid flow 7b registered by the mass flow sensor 1 will, however, not cease as the volume in between the valve members 2 and 3 is filled with fluid. Due to the leakage of downstream valve member 3, the fluid will keep flowing until upstream valve member 2 closes. The leakage of valve member 3 thus yields a prolonged flow of fluid registered by mass flow sensor 1.

Figure 4:
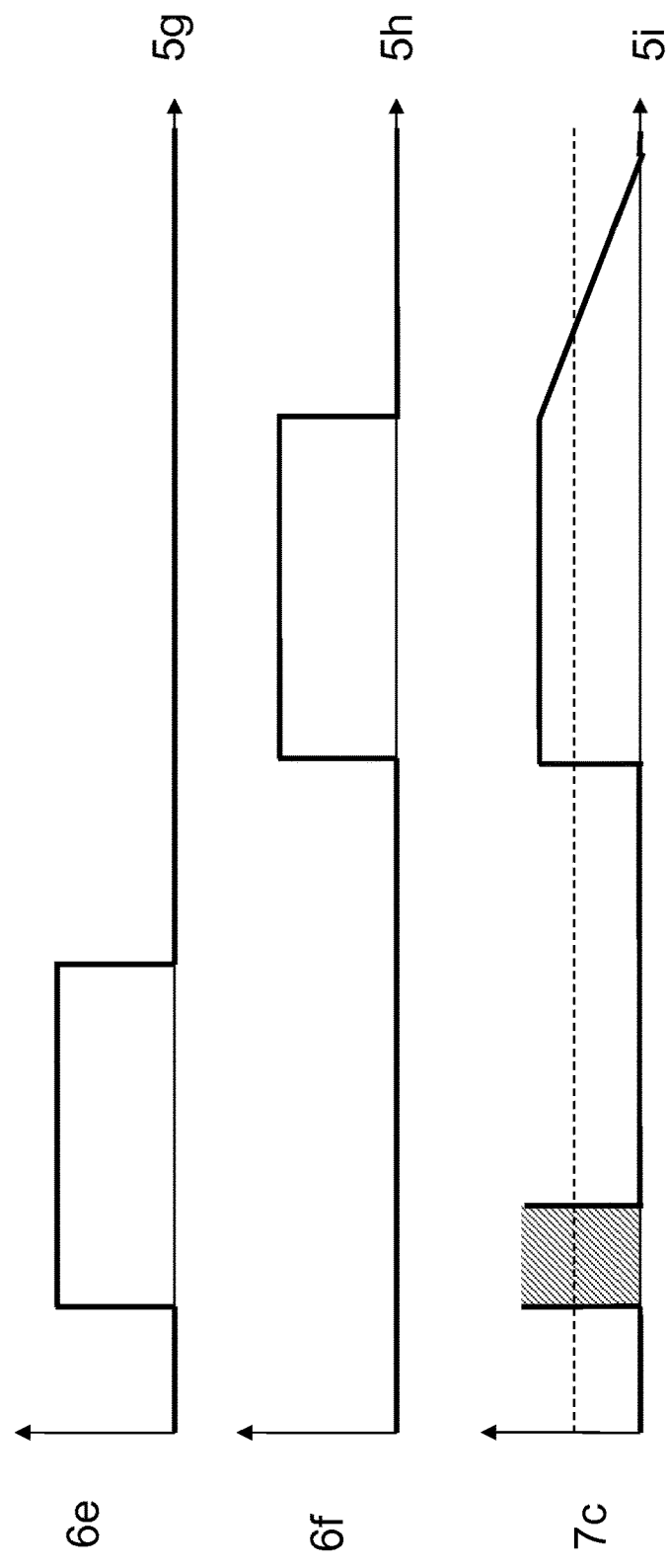
FIG. 4 provides several graphs of a valve assembly with the upstream valve member leaking.

FIG. 4 shows a situation similar to that of FIG. 3 except that valve member 2 is now leaking instead of valve member 3. As the upstream valve member 2 opens (6e), the mass flow sensor 1 may register fluid flow 7c into the middle section in between the valve members 2 and 3. The sensor 1 will register fluid flow 7c only if the pressure in between the valve members 2, 3 is below the pressure on the upstream side. The flow of fluid 7c will cease as soon as the pressures upstream and downstream of the valve member 2 are the same. The pressures upstream of valve member 2 and in the middle section are then equalized. The signal registered by the mass flow sensor 1 may depend on the extent of the leakage of valve member 2. If that leakage results in equal pressures upstream and downstream of valve member 2 before even opening valve member 2, no signal will be registered.

As soon as valve member 3 opens (6f), the leakage of upstream valve member 2 will result in a fluid flow registered by mass flow sensor 1. Valve member 2 may actually no longer obstruct the flow channel at all. If that is the case, the valve assembly may operate as if there was no valve member 2. The mass flow sensor 1 will then experience constant mass flow 7c versus time 5i until closure of valve member 3.

Due to the leakage of valve member 2, the upstream mass flow sensor 1 will record fluid flow even after closure of valve member 3. The mass flow 7c versus time 5i will actually begin to decline as valve member 3 closes. The mass flow sensor 1 will only stop registering a signal when the pressures upstream and downstream of valve member 2 are equal.

Figure 6:
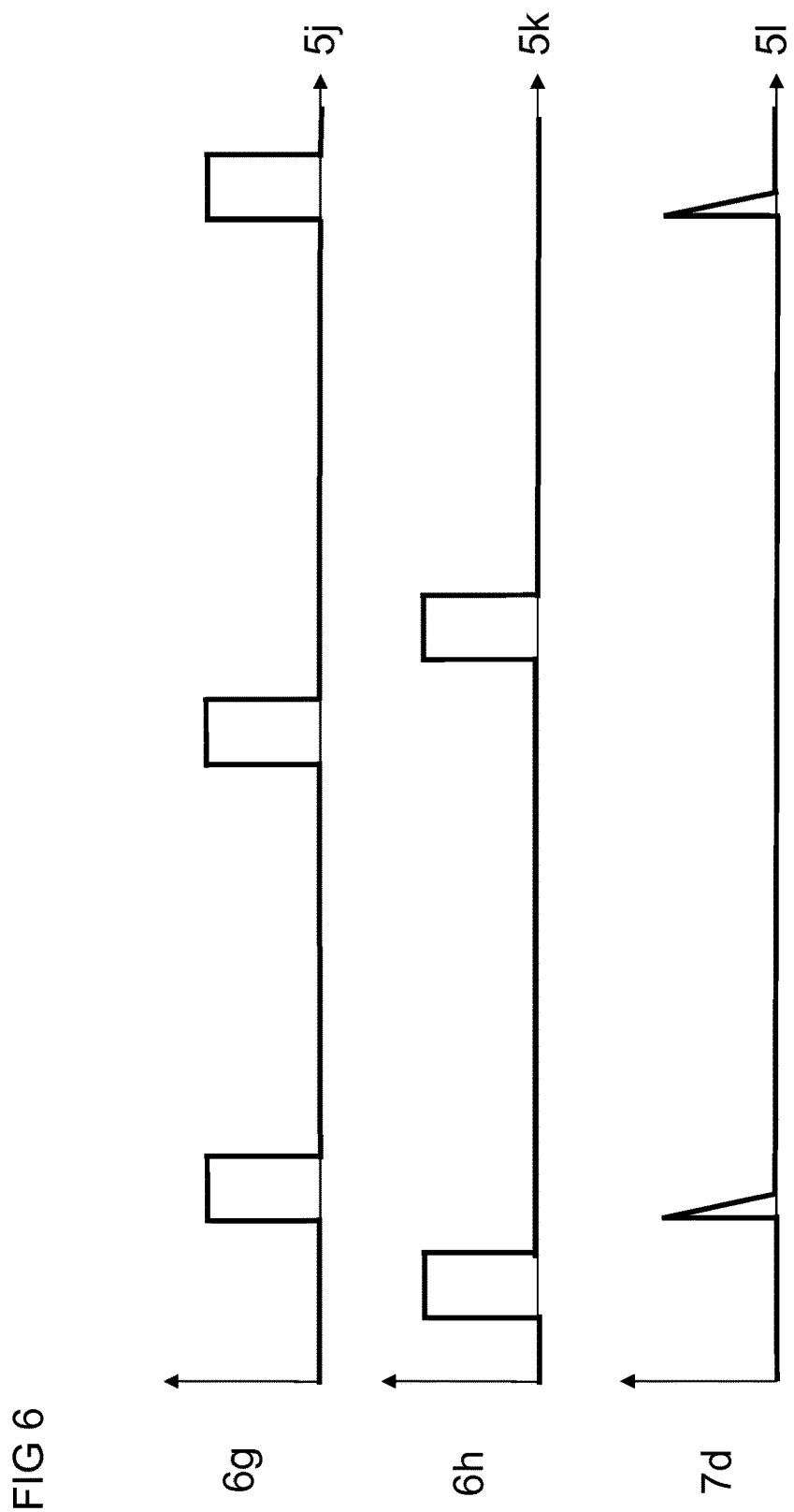
FIG. 6 provides several graphs with details of a measurement while opening or closing a valve member, assuming no leakage.

FIG. 6 shows mass flow measurements carried out at the instant of opening or of closing a valve member 2, 3. FIG. 6 details the case where no valve member shows leakage.

At the beginning downstream valve member 3 opens (6h) and fluid flows out of the middle section between the valve members 2, 3. When the pressures upstream and downstream of valve member 3 are equal, valve member 3 closes. Upstream valve member 2 opens immediately thereafter (6g).

The mass flow sensor 1 then registers fluid flow in the form of a pulse. The signal 7d registered by the mass flow sensor shows a sharp rise as the upstream valve member 2 opens. The same signal 7d drops quickly as the middle section in between valve members 2 and 3 is filled with fluid. Valve member 2 closes upon equalization of the two pressures in between the valves 2, 3 and at the inlet.

After a while the upstream valve member 2 opens again (6g) and closes a short time thereafter. This time the mass flow sensor 1 will not record a signal, because the pressures upstream and downstream of valve member 2 should be the same.

Graph 6h shows that downstream valve member 3 then opens and closes. By opening and closing valve member 3, the middle section will be vented towards the outlet of the valve assembly. Since the mass flow sensor 1 is arranged upstream of valve member 2 and valve member 2 is closed, the sensor 1 will not pick up a signal.

The sensor 1 will, however, pick up a signal as soon as valve member 2 opens. Fluid from the inlet of the valve assembly then enters the middle section in between valve members 2 and 3. The mass flow sensor 1 will pick this up in the form of the short pulse shown on graph 7d.

It is envisaged that the integrals of the pulses shown on graph 7d are employed to further analyze leakage. In an alternate embodiment, the peaks of the same pulses are used to further process the signals obtained.

In yet another embodiment, integration of a pulse is carried out between a start point and an end point. The start point may be the instant when the valve opens. Alternatively, the start point is defined as the instant when a given threshold along the rising edge of a pulse is reached. The end point is defined as the instant when a given threshold, preferably 50% of the peak of the pulse, along the falling edge is reached. In an alternate embodiment, the definition of the end point relies on another percentage such as 90% or 10% of the peak of the pulse. The quantities derived in this manner provide fair estimates of pulse magnitudes.

In yet another embodiment, the magnitude of a pulse is determined by multiplying the peak of a pulse with its width. Pulse width is, for instance, measured between 50% of the peak of the pulse along the rising and falling edges. In yet another embodiment, the magnitude of a pulse is determined by multiplying the peak of a pulse with its integral.

It is envisaged that the integration of a pulse obtained from the mass flow sensor 1 is triggered as at least one of the valve members 2, 3 commences its open operation.

In yet another embodiment, quasi-integration is employed to analyze the pulses obtained from the mass flow sensor 1. Quasi-integration relies on a low-pass filter. The bandwidth of this filter is chosen such that its upper limit is shorter than the inverse of the duration of a typical pulse. Typical pulses last between 100 milliseconds and 300 milliseconds and most pulses are shorter than 500 milliseconds. In a particular embodiment, the upper limit of the bandwidth of the quasi-integration filter is at least three times lower than the inverse of pulse duration.

The previous steps of pulse analysis can, for instance, be carried out by a microprocessor receiving data from the mass flow sensor 1. In a preferred embodiment, the microprocessor is integrated in the control unit 12. It is also envisaged that the microprocessor provides memory for storing time series of pulses.

Once a quantity has been derived that corresponds to the magnitude of the pulse, the same quantity may be compared to a threshold value. The threshold value may be a historical threshold value stored in the memory of the microprocessor. The threshold value may also rely on design parameters of the valve assembly such as typical close/open times of valve members, the volume of the middle section etc. Further, an operator may set and/or change threshold values.

It is envisaged that the valve assembly, in particular its microprocessor, is configured to output a warning signal when the magnitude of a pulse exceeds a first threshold. It is also envisaged that the valve assembly will output a lock-out signal when the magnitude of a pulse exceeds a second threshold. The warning signal and the lock-out signal are typically part of the indication of valve status. Also, a timestamp may be determined and attributed to a signal such as a pulse. It is envisaged that the microprocessor factors in the timestamp of a signal (such as a pulse) prior to outputting a (lock-out or warning) signal.

It is further envisaged that comparison of pulse magnitude with threshold values is carried out by analogous circuits within the control unit 12. Analogous circuits known in the art comprise potentiometers to set threshold values. Analogous circuits for pulse comparison may also provide Schmitt-trigger elements based on operational amplifiers.

Figure 5:
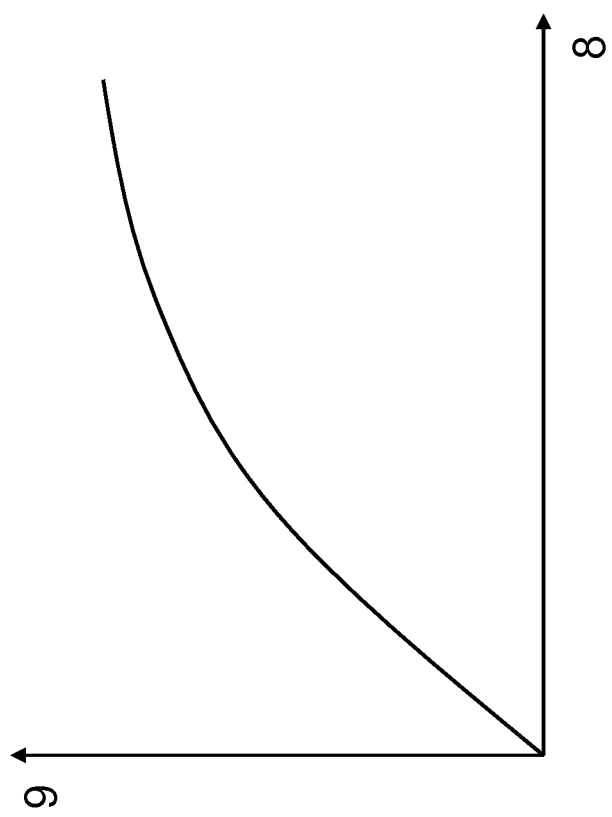
FIG. 5 is a plot of peak voltage of a mass flow sensor versus pressure at the inlet of the valve assembly.

The peak of the signal obtained from the mass flow sensor 1 can be employed to determine the pressure at the inlet of the valve assembly. To that end, FIG. 5 shows a plot of peak signal 9 measured by the mass flow sensor 1 versus pressure 8 at the inlet of the valve assembly.

The peak value or any other meaningful magnitude of the pulse obtained from the sensor 1 yields the amount of fluid flowing into the middle section. The volume of the middle section in between valve members 2 and 3 and/or a previously obtained reference value can be used to derive the pressure 8 at the inlet of the valve assembly.

Figure 7:
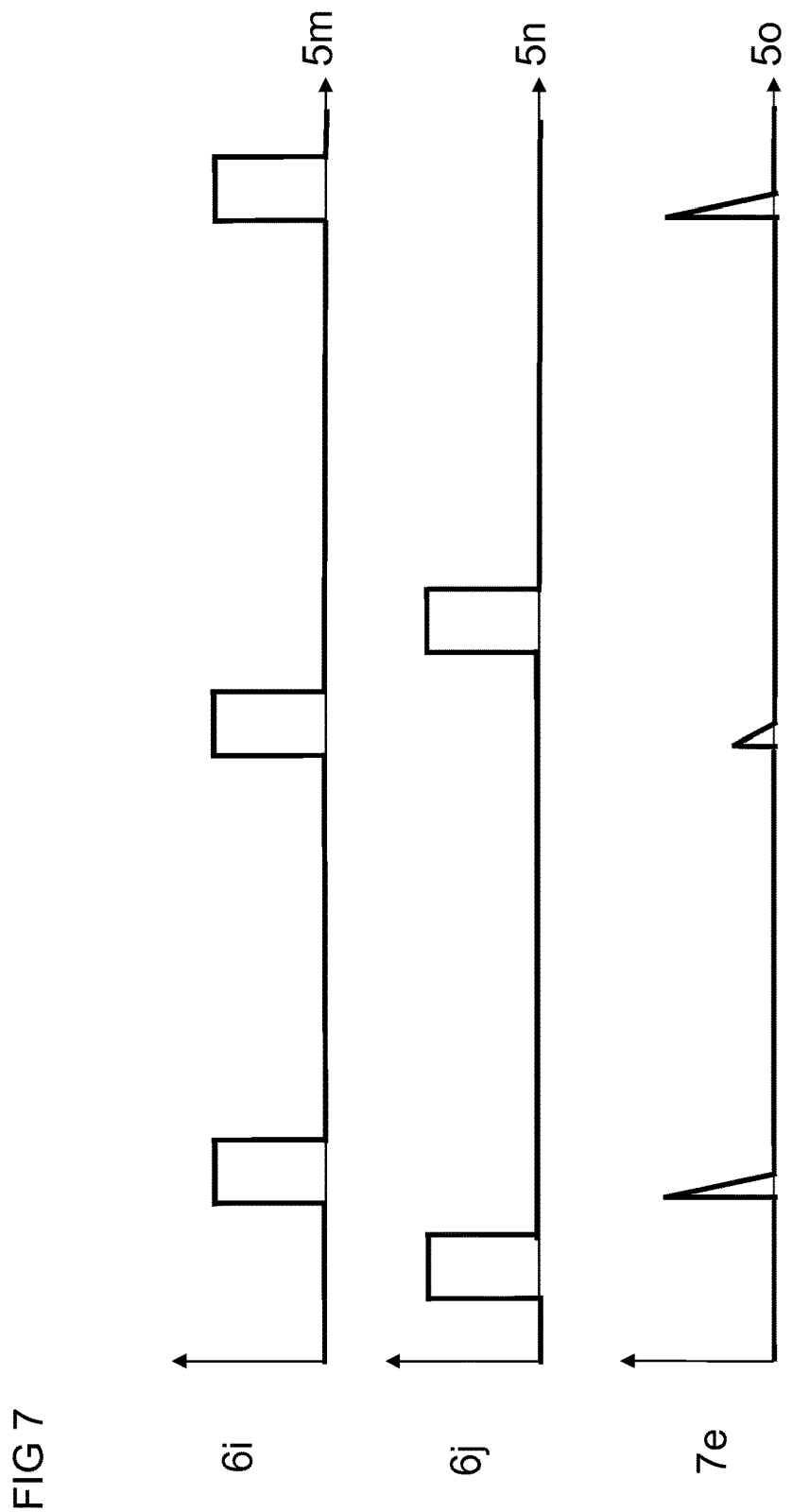
FIG. 7 shows the same measurement sequence as FIG. 6, but with the downstream valve member being faulty (leaking).

A situation similar to that of FIG. 6 is depicted on FIG. 7. The only difference between FIG. 6 and FIG. 7 is that the downstream valve member 3 is now assumed to be leaking.

FIG. 7 shows the same sequences 6i, 6j of valve members 2, 3, opening and closing as FIG. 6. At the beginning, valve member 3 opens and closes and this is followed by valve member 2 opening and closing. As is the case on FIG. 6, the mass flow sensor 1 picks up a signal when the upstream valve member 2 opens (6i).

After some time, the upstream valve member 2 opens again. Since valve member 3 is now assumed to be leaking, a pressure loss will have occurred in the middle section between valve members 2 and 3. By opening the upstream valve member 2, the pressures upstream and downstream of this valve member 2 are equalized. The mass flow sensor 1 will consequently pick up a signal 7e. This signal corresponds to the pressure loss in the middle section induced by leaking valve member 3.

In other words, the presence of a leak in valve member 3 is identified by the presence of an additional pulse obtained from the mass flow sensor 1. The magnitude of the leak can, by way of example, be derived from the integral, from the peak height or from the quasi-integral of that pulse. The valve assembly may continue and process the signal as outlined in the above notes on signal processing.

A situation similar to that of FIGS. 6 and 7 is depicted on FIG. 8. The only difference is that the upstream valve member 2 is now leaking.

FIG. 8 shows the same sequences of valve members 2, 3 opening and closing as FIGS. 6 and 7. At the beginning, valve member 3 opens and closes (6l) and this is followed by valve member 2 opening and closing (6k). As is the case on FIGS. 6 and 7, the mass flow sensor 1 picks up a signal when the upstream valve member 2 opens.

FIG. 8 shows that some time is allowed to lapse in between the closing of valve member 3 and the opening of valve member 2. The time span between subsequent operations of valve members typically is 3 seconds to 20 seconds, preferably 3 seconds to 12 seconds, yet more preferably 3 seconds to 5 seconds.

The upstream valve member 2 is now assumed to be leaking. Consequently, some fluid will leak into the middle section of the valve assembly between the closure of valve member 3 and the opening of valve member 2. When valve member 2 opens again, the middle section in between the two valve members 2, 3 will be filled with fluid to some extent. The amount of fluid passing valve member 2 and entering the middle section will be less than in case of no leakage. Consequently, the final peak in the plot of mass flow sensor signal 7f versus time 5r is now smaller than it is on FIG. 6.

In other words, in the present scheme a leakage of upstream valve member 2 is detected by means of a final pulse with reduced magnitude. The magnitude of the leak can, by way of example, be derived from the integral, from the peak height or from the quasi-integral of that pulse. The valve assembly may continue and process the signal as outlined in the notes on FIG. 6.

FIG. 9 shows a valve leakage test that is carried out after a shut down procedure. It seems worth stressing that FIGS. 9 and 10 assume no leakage.

As the valve assembly shuts down fluid flow, valve member 2 closes first. Subsequently, valve member 3 closes. The same is indicated in the upper two graphs 6m, 6n of FIG. 9. Graph 7g shows that fluid flow is interrupted as soon as the upstream valve member 2 closes. Now the same pressures apply to the middle section in between the two valve members 2, 3 and the outlet of the valve assembly.

After a while valve member 2 opens and closes again. Fluid enters the middle section and the mass flow sensor 1 registers a pulse. If the upstream valve member 2 was leaking, the magnitude of that pulse would be reduced. The reduction in pulse magnitude actually depends on the extent of the leakage.

A period of time is allowed to lapse and valve member 2 opens and closes again. The mass flow sensor 1 should not pick up a pulse unless downstream valve member 3 is faulted and shows leakage.

After the start-up sequence of the fire installation has begun, then valve member 3 opens and closes. The middle section of the valve assembly will then be vented towards the outlet of the assembly. A mass flow sensor arranged upstream of valve member 2 will still not record a pulse, because valve member 2 remains closed.

Soon thereafter, valve member 2 opens. The mass flow sensor 1 now registers a pulse. The same pulse will fade quickly, because downstream valve member 3 is still closed. By using this pulse in the manner described above the input pressure of fuel is measured. The measured value is then checked. If input pressure is within predefined limits, the start-up sequence of the burner start-up will continue. If this value is outside predefined limits, the input pressure will either be too high or too low. Both of the valve members 2, 3 will shut and the valve status 15 will indicate a stop of the fire installation.

As valve member 3 opens, both valve members are in their open positions. The mass flow sensor 1 will now indicate stationary fluid flow through the valve assembly.

The present disclosure is not limited to mass flow sensors being arranged upstream of valve member 2. FIG. 10 shows a sequence of valve operations with a mass flow sensor arranged downstream of valve member 3.

At the beginning the valve assembly shuts off fluid supply by first closing valve member 3 and then closing valve member 2 (6*p*, 6*o*). It seems worth noting that the order of closing and opening valve members in FIG. 10 is reversed compared to FIG. 9. The signal registered by the mass flow sensor is shown on FIG. 7*h*. The downstream sensor detects a signal until the first of the two valve members 2, 3 closes.

After a defined period of time valve member 3 opens and closes. The mass flow sensor picks up a signal as the middle section is vented. If valve member 3 was faulted and leaking, the peak registered by the mass flow sensor would be lower than the peak shown on FIG. 10.

After a while valve member 3 opens and closes again. The mass flow sensor no longer picks up a signal, since the middle section has been vented before. If valve member 2 was leaking, that leakage would result in an extra amount of fluid in the middle section. The same amount would be registered by the mass flow sensor.

After commencement of the start-up sequence of the firing control unit, the upstream valve member 2 will open and close. This operation has no effect on the mass flow sensor, since the sensor is now assumed to be arranged downstream.

The mass flow sensor only registers a short pulse as valve member 3 opens. By using this pulse in the manner described above the fuel input pressure is measured. The measured pressure value is checked. If it is within predefined limits, the burner will continue to operate. As the valve member 2 opens, the middle section of the valve assembly gets filled with gas. The mass flow sensor finally records stationary flow as soon as the two valve members 2, 3 are in their open positions. It seems worth stressing that FIGS. 9 and 10 give examples of how the same mass flow sensor is used to record stationary flow and to detect leakage. The mass flow sensor will record stationary flow when the two valve members 2, 3 are open. This is typically the case while a gas-fired installation is running. The same mass flow sensor also registers peaks when the middle section of the assembly is vented or refilled with fluid. The same is typically the case during leakage tests.

As described above, a defined quantity is determined as a result of each test. A control unit 12 compares this quantity to a predefined threshold. The predefined threshold for leakage tests of valve member 2 may actually be different from the predefined threshold for leakage tests of valve member 3. Also, the thresholds for minimum or for maximum gas pressures usually differ from thresholds for leakage tests.

The aforementioned thresholds are provided to control unit 12 by data transfer from external physical parts or from software components. Thresholds may actually be directly programmed into the control unit 12.

By using at least one test result, preferably by using a plurality of test results, the control unit 12 analyses the results of the abovementioned diagnostic test sequences. The control unit 12 eventually generates an indication of valve status 15.

Possible indications of valve status are "status correct" and/or "OK" and/or "small leakage" and/or "critical leakage" and/or "input pressure too low" and/or "input pressure too high". This list is not exhaustive. Also, some of these indications may be omitted. It is envisaged that in indication of valve status 15 does not contain information about input pressure. It is also envisaged that no indication of "small leakage" is generated or transmitted.

The indication of valve status 15 should allow other external software components or physical components to process and/or to display the valve status. An indication of valve status 15 also functions to suppress a request signal 16 if required.

In an exemplary embodiment indications of valve status 15 are processed as follows:

"status correct", "OK": Normal valve operation for gas firing possible on request. Control gate 17 enables request of signal 16. No display of a special warning signal for maintenance.

"small leakage": Normal valve operation for gas firing possible on request. Control gate 17 enables request of signal 16. Display of a special warning signal for maintenance.

"critical leakage": Stop of operation for gas firing. Control gate 17 disables request of signal 16. Display of a special lock-out signal. Request signal 16 with no effect. Gas firing not possible.

"input pressure too low": Stop of normal valve operation until the valve diagnosis control unit 12 changes valve status 15. Control gate 17 disables a request of signal 16 during this time.

"input pressure too high": Stop of normal valve operation until the valve diagnosis control unit 12 changes valve status 15. Control gate 17 disables a request of signal 16 during this time.

The states "small leakage" or "critical leakage" can be sub classified as applying to valve member 2 or to valve member 3. This approach allows assignment of maintenance and of failure signals to individual valve members 2, 3.

The measured value of gas input pressure can be transmitted by the control unit 12 to other external components. These external components may process and/or may display pressure. An installation routine may, for instance, use the transmitted pressure value and adjust a pressure governor mounted upstream of the valve. The pressure value may as well become a set point of an automatically adjustable pressure governor. In another embodiment, the control unit 12 transmits leakage values of one or of all gas valves in order to display a leakage status for maintenance purposes. Transmission of input pressure values and of leakage values is generally part of the transmission of the indication of valve status.

The skilled person understands that in a preferred embodiment the flow sensor is directly mounted in the flow channel. The skilled person also understands that the flow sensor can alternatively be mounted in a branch of the flow channel.

Any steps of a method according to the present disclosure may be embodied in hardware, in a software module executed by a processor, or in a cloud computer, or in a combination of these. The software may include a firmware, a hardware driver run in the operating system, or an application program. Thus, embodiments of the invention also relate to a computer program product for performing the operations presented herein. If implemented in software, the functions described may be stored as one or more instructions on a computer-readable medium. Some examples of storage media that may be used include random access memory (RAM), read only memory (ROM), flash memory, EPROM memory, EEPROM memory, registers, a hard disk, a removable disk, other optical disks, or any available media that can be accessed by a computer or any other IT equipment and appliance.

It should be understood that the foregoing relates only to certain embodiments of the invention and that numerous changes may be made therein without departing from the spirit and the scope of the invention as defined by the following claims. It should also be understood that the invention is not restricted to the illustrated embodiments and that various modifications can be made within the scope of the following claims.

REFERENCE NUMERALS 1 mass flow sensor
2 upstream valve member
3 downstream valve member
4 direction of flow
5a-5x time
6a-6p valve positions
7a-7h signal obtained from the mass flow sensor
8 pressure at the inlet of the valve assembly
9 peak voltage measured by the mass flow sensor
10, 11 valve actuators
12 control unit
13, 14 excitation signals
15 indication of valve status
16 input signals
17 control gate

What is claimed is:

1. A method of diagnosis of a valve assembly of a gas-fired installation, which valve assembly includes a plurality of valve members serially arranged along a flow channel of the valve assembly connecting at least one inlet and at least one outlet of the valve assembly, the method comprising:
   during an operation of the gas-fired installation, measuring a flow of a fluid through the flow channel of the valve assembly using a mass flow sensor,
   closing at least one of the serially arranged valve members of the valve assembly such that fluid flow is prevented through the flow channel,
   opening at least one of the valve members of the valve assembly to permit a fluid flow from an upstream side of the at least one valve member to a downstream side of the at least one valve member,
   measuring at least one signal related to fluid flow using the mass flow sensor,
   determining at least one quantity characterizing the at least one signal,
   comparing the at least one quantity to at least one threshold value, and
   determining that the at least one quantity exceeds the at least one threshold value, and in response to such determination, detecting a leakage flow having a flow velocity between 0.1 m/s and 5 m/s caused by at least one faulted valve member of the plurality of valve members,
   wherein the at least one sensor is configured to (a) detect the leakage flow having the flow velocity between 0.1 m/s and 5 m/s, and (b) measure normal operational flow velocities through the flow channel of the gas-fired installation in operation.

2. The method of claim 1, comprising closing all of the serially arranged valve members of the valve assembly to thereby interrupt a flow of fluid through the flow channel.

3. The method of claim 1, further comprising checking, by the mass flow sensor, for an absence of fluid flow through the valve assembly.

4. The method of claim 1, wherein the fluid is at least one of gaseous or combustible.

5. The method of claim 1, comprising determining at least one quantity characterizing the at least one signal by integrating the at least one signal.

6. The method of claim 5, comprising performing an integration of a pulse during a time between a start point and an end point,
   wherein the start point is an instant of valve opening or an instant of the pulse reaching a first pulse threshold along a rising edge of the pulse, and
   wherein the end point is a moment of the pulse reaching a second pulse threshold along a falling edge of the pulse.

7. The method of claim 1, wherein the at least one quantity characterizing the at least one signal is a peak of the at least one signal.

8. The method of claim 5, wherein the at least one quantity characterizing the at least one signal is a pulse width between a defined point along a rising edge and a defined point along a falling edge of the pulse.

9. The method of claim 5, comprising determining the at least one quantity characterizing the at least one signal by multiplying the integral and a peak of the at least one signal.

10. The method of claim 1, further comprising:
    comparing, by a control unit, the at least one quantity to a quantity threshold, and
    generating, by the control unit, an indication of a valve status based on the comparison of the at least one quantity to the quantity threshold.

11. The method of claim 10, further comprising controlling the fluid flow depending on the valve status.

12. The method of claim 10, further comprising displaying an indication of the valve status via a display device.

13. A non-transitory, tangible computer readable medium storing a computer program product for diagnosing of a valve assembly of a gas-fired installation, which valve assembly includes a plurality of valve members serially arranged along a flow channel of the valve assembly connecting at least one inlet and at least one outlet of the valve assembly, the computer program product comprising instructions executable by a processor to:

during an operation of the gas-fired installation, control at least one flow sensor to measure a flow of a fluid through the flow channel of the valve assembly,
close at least one of the serially arranged valve members of the valve assembly such that fluid flow is prevented through the flow channel,
open at least one of the valve members of the valve assembly to permit a fluid flow from an upstream side of the at least one valve member to a downstream side of the at least one valve member,
control the at least one flow sensor to measure at least one signal related to fluid flow, wherein the at least one signal comprises a pulse,
apply quasi-integration to the at least one signal to determine at least one quantity characterizing the at least one signal,
compare the at least one quantity to at least one threshold value, and
determine that the at least one quantity exceeds the at least one threshold value, and in response to such determination, detect a leakage flow caused by at least one faulted valve member of the plurality of valve members,
wherein the at least one sensor is configured to (a) detect the leakage flow having a flow velocity between 0.1 m/s and 5 m/s, and (b) measure normal operational flow velocities through the flow channel of the gas-fired installation in operation.

14. A valve assembly of a gas-fired installation, the valve assembly comprising:
an inlet and an outlet,
a flow channel connecting the inlet to the outlet,
a plurality of valve members serially arranged along a flow channel of the valve assembly,
at least one actuator configured to open at least one of the valve members, and
at least one flow sensor arranged either: (i) between the inlet of the valve assembly and the valve member closest to the inlet, or (ii) between the outlet of the valve assembly and the valve member that is closest to the outlet,
wherein the at least one flow sensor is configured to (a) detect a leakage flow having a flow velocity between 0.1 m/s and 5 m/s, caused by at least one faulted valve member of the plurality of valve members and (b) measure normal operational flow velocities through the flow channel of the gas-fired installation in operation.

15. The valve assembly of claim 14, wherein the flow sensor is arranged between the inlet of the valve assembly and the valve member of the plurality of valve members that is closest to the inlet.

16. The valve assembly of claim 14, wherein:
the flow sensor is arranged between the outlet of the valve assembly and the valve member of the plurality of valve members that is closest to the outlet, or
the valve assembly comprises the flow sensor arranged between two of the valve members.

17. The valve assembly of claim 14, wherein at least one of the valve members is a modulating valve member or an on/off valve.

18. The valve assembly of claim 14, wherein the valve assembly further comprises:
at least one actuator configured to actuate a valve member,
at least one control unit configured to excite the at least one actuator using at least one excitation signal,
wherein the control unit is configured to excite the at least one actuator in accordance with at least one predefined program sequence and in response to at least one request signal,
wherein the control unit is configured to generate at least one indication of valve status as a result of excitation in accordance with the at least one program sequence, and
wherein the valve assembly further comprises at least one control gate configured to transmit or to suppress the at least one request signal.

* * * * *